(12) United States Patent
Kim

(10) Patent No.: US 12,306,971 B2
(45) Date of Patent: May 20, 2025

(54) SYSTEM FOR PRIVATELY SHARING VERIFIED VIDEO

(71) Applicant: Inbet Co., Ltd., Seoul (KR)

(72) Inventor: Jong Cheol Kim, Seoul (KR)

(73) Assignee: Inbet Co., Ltd., Seoul (KR)

(*) Notice: Subject to any disclaimer, the term of this patent is extended or adjusted under 35 U.S.C. 154(b) by 229 days.

(21) Appl. No.: 17/954,314

(22) Filed: Sep. 27, 2022

(65) Prior Publication Data

US 2023/0099823 A1    Mar. 30, 2023

(30) Foreign Application Priority Data

Sep. 29, 2021    (KR) .......................... 10-2021-0128744

(51) Int. Cl.
| | | |
|---|---|---|
| H04L 9/00 | (2022.01) | |
| G06F 21/16 | (2013.01) | |
| G06F 21/62 | (2013.01) | |
| G06F 21/64 | (2013.01) | |
| G06F 21/10 | (2013.01) | |

(52) U.S. Cl.
CPC .......... *G06F 21/6209* (2013.01); *G06F 21/16* (2013.01); *G06F 21/64* (2013.01); *G06F 21/1063* (2023.08)

(58) Field of Classification Search
CPC ....... G06F 21/6209; G06F 21/16; G06F 21/64
USPC .......................................................... 713/165
See application file for complete search history.

(56) References Cited

U.S. PATENT DOCUMENTS

| | | | | |
|---|---|---|---|---|
| 11,190,733 | B1* | 11/2021 | Anderson | .............. H04N 7/155 |
| 2015/0150038 | A1* | 5/2015 | Hao | .......................... G06F 21/41 |
| | | | | 725/31 |
| 2016/0087806 | A1* | 3/2016 | Genter | .................... G06F 21/64 |
| | | | | 713/178 |
| 2018/0349732 | A1* | 12/2018 | Park | ....................... G06N 20/00 |
| 2020/0349540 | A1* | 11/2020 | Cho | ........................ G06F 21/16 |
| 2022/0103370 | A1* | 3/2022 | Alwen | ..................... H04L 61/45 |
| 2023/0038652 | A1* | 2/2023 | Adam | ..................... G06F 21/64 |
| 2024/0346604 | A1* | 10/2024 | Wang | ..................... G06F 16/71 |

FOREIGN PATENT DOCUMENTS

| | | |
|---|---|---|
| KR | 10-2017-0098701 A | 8/2017 |
| KR | 10-2018-0008187 A | 1/2018 |
| KR | 10-2020-0047462 A | 5/2020 |
| KR | 10-2021-0030874 A | 3/2021 |

OTHER PUBLICATIONS

Non-final Office Action dated Jun. 26, 2023 from the Korean Patent Office for Korean Application No. 10-2021-0128744.
Final Office Action dated Nov. 14, 2023 from the Korean Patent Office for Korean Application No. 10-2021-0128744.
Notice of Allowance dated Mar. 4, 2024 from the Korean Patent Office for Korean Application No. 10-2021-0128744.

* cited by examiner

*Primary Examiner* — Christopher J Brown
(74) *Attorney, Agent, or Firm* — Insight Law Group, PLLC; Seung Lee

(57) ABSTRACT

Provided is a system for privately sharing a verified video which ensures that a video recorded in real time by a video creator is not tampered with by a third party and thus prevents the original video from being edited and maliciously used.

17 Claims, 2 Drawing Sheets

SYSTEM FOR PRIVATELY SHARING VERIFIED VIDEO

CROSS-REFERENCE TO RELATED APPLICATION(S)

This application claims priority from Korean Patent Application No. 10-2021-0128744, filed on Sep. 29, 2021, in the Korean Intellectual Property Office, the disclosure of which is incorporated herein by reference in its entirety.

BACKGROUND

1. Field

The following description relates to a video sharing technology, and more specifically, to a system for privately sharing a verified video.

2. Description of Related Art

Video services are being widely used in various fields by, for example, recording and storing a video of a goods packaging process and dealing with a customer's claim by providing the recorded video of the goods packaging process to the customer who made the claim, or recording and uploading a video of goods to an online market.

However, there is an increasing trend of a third party who is not a video creator editing and maliciously using an original video. Therefore, the applicant of the present invention researched a technology for preventing an original video from being edited and maliciously used by ensuring that a video recorded in real time by a video creator has not been tampered with by a third party.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

The following description relates to a system for privately sharing a verified video which ensures that a video recorded in real time by a video creator has not been tampered with.

Technical objects to be achieved in the present invention are not limited to those described above, and other technical objects what have not been described will be clearly understood by those of ordinary skill in the art from the following description.

In one general aspect, a system for privately sharing a verified video includes a verified video receiver configured to receive a verified video in real time which is uploaded in real time from a user terminal on which a verified video application (app) for recording and uploading a non-tamperable verified video in real time is installed, a verified video registrar configured to store and register the non-tamperable verified video received in real time by the verified video receiver in a database (DB), and a verified video sharer configured to transmit the non-tamperable verified video stored and registered in the DB by the verified video registrar to at least one receiver terminal specified by a user and privately share the non-tamperable verified video.

The non-tamperable verified video may include unique anti-tampering information in metadata.

The unique anti-tampering information may include a unique media access control (MAC) address and geolocation of the user terminal on which the verified video app is installed.

A unique MAC address of the user terminal on which the verified video app is installed may be overlayed on a specific area of a displayed screen at a time point at which the non-tamperable verified video is recorded.

A recording time and a time zone may be further overlayed on the specific area of the displayed screen at the time point at which the non-tamperable verified video is recorded.

An anti-tampering authentication mark may be further overlayed on the specific area of the displayed screen at the time point at which the non-tamperable verified video is recorded.

The verified video sharer may stream the verified video to the receiver terminal to prevent tampering.

The verified video sharer may download the verified video which is non-editable and non-retransmissible to the receiver terminal to prevent tampering.

The verified video app may block access from other apps to prevent tampering.

The system may further include a video clustering part configured to cluster a plurality of individual verified videos and generate clustered verified videos.

The system may further include a ticket issuer configured to issue a digital ticket that permits recording of the verified video to the user terminal.

The system may further include a private sharing target manager configured to store a unique MAC address of the receiver terminal which plays the verified video, a date and time at which the verified video is played, and a number of times that the verified video is played in the DB and manage a play log.

Other features and aspects will be apparent from the following detailed description, the drawings, and the claims.

Figure 1:
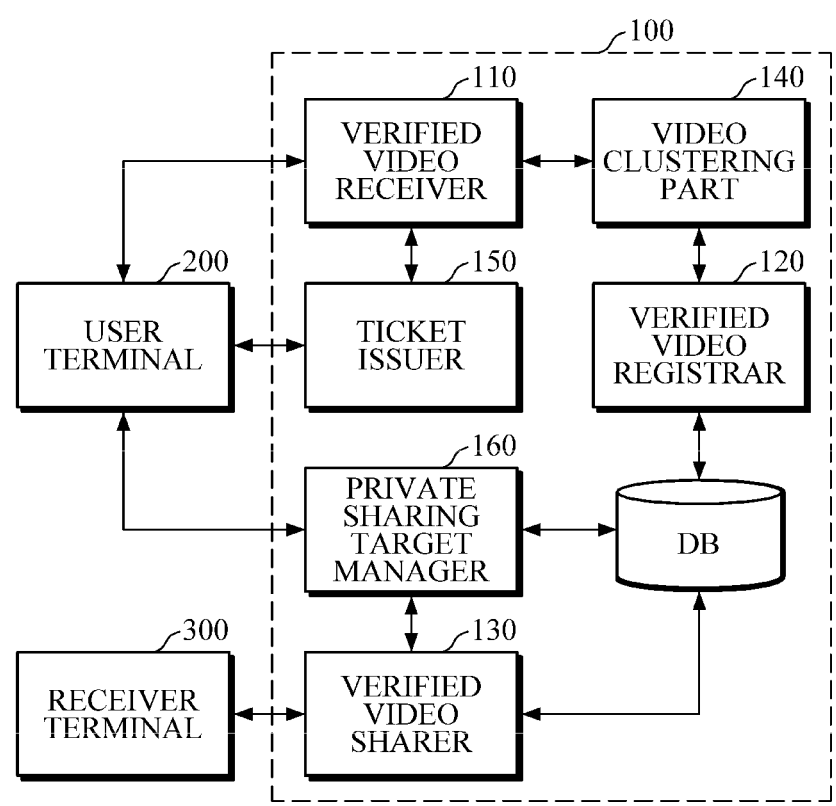
FIG. 1 is a block diagram of a system for privately sharing a verified video according to the present invention.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

Hereinafter, the present invention will be described in detail through exemplary embodiments with reference to the accompanying drawings such that those of ordinary skill in the art can readily understand and implement the present invention. Certain embodiments are illustrated in the drawings and described in detail but are not intended to limit various embodiments of the present invention to specific forms.

In describing the present invention, when it is determined that the detailed description of a related known function or configuration may unnecessarily obscure the subject matter of the present invention, the detailed description will be omitted.

When a component is referred to as being "connected" or "coupled" to another component, the component may be directly connected or coupled to the other component, but it should be understood that another component may be present between the components.

On the other hand, when a component is referred to as being "directly connected" or "directly coupled" to another component, it should be understood that there are no other components between the components.

FIG. 1 is a block diagram of a system for privately sharing a verified video according to an exemplary embodiment of the present invention. As shown in FIG. 1, a system 100 for privately sharing a verified video according to the exemplary embodiment includes a verified video receiver 110, a verified video registrar 120 and a verified video sharer 130.

The verified video receiver 110 receives a verified video in real time which is uploaded in real time from a user terminal 200 on which a verified video application (app) for recording and uploading a non-tamperable verified video in real time is installed. For example, the user terminal 200 may be a smartphone but is not limited thereto.

Meanwhile, the verified video app is an app for recording a verified video in real time and uploading the verified video in real time to the system 100 for privately sharing a verified video and receiving and playing a verified video uploaded to the system 100 for privately sharing a verified video. The system 100 for privately sharing a verified video does not allow apps other than the verified video app to upload and play a video and thus can ensure that a verified video is not tampered with.

Also, the verified video app may block access from other apps to prevent tampering. When access from other apps is blocked to prevent other apps from interrupting operations of the verified video app, it is possible to prevent other apps from tampering with a verified video in a video recording process.

The verified video registrar 120 stores and registers the non-tamperable verified video received in real time by the verified video receiver 110 in a database (DB). The verified video registrar 120 may store the non-tamperable verified video in the DB in combination with identification information of a user who records the verified video and identification information of a receiver who receives the verified video.

For example, the user identification information may be identification information of a user terminal which records the verified video and on which the verified video app is installed. The identification information of the user terminal on which the verified video app is installed may be a mobile phone number of the owner of the user terminal and/or a unique media access control (MAC) address of the user terminal but is not limited thereto.

Meanwhile, the receiver identification information may be identification information of a receiver terminal on which the verified video app for receiving and playing a verified video is installed. The identification information of the receiver terminal on which the verified video app is installed may be a mobile phone number of the owner of the receiver terminal and/or a unique MAC address of the receiver terminal but is not limited thereto.

The verified video sharer 130 transmits the non-tamperable verified video stored and registered in the DB by the verified video registrar 120 to at least one receiver terminal 300 specified by the user and privately shares the non-tamperable verified video.

The verified video sharer 130 may transmit a message having a deep link to a network location in which the non-tamperable verified video is stored to the receiver terminal 300 through a short message, a multimedia message, a social networking service (SNS) message, etc. so that the receiver terminal 300 may execute the verified video app to receive the verified video from the network location at which the verified video is stored and play the verified video.

Meanwhile, the at least one receiver terminal 300 which will receive the non-tamperable verified video may be specified through the verified video app installed on the user terminal 200. The at least one receiver terminal 300 which will receive the non-tamperable verified video may be specified by inputting the mobile phone number of the owner of the receiver terminal 300 but is not limited thereto.

For example, the verified video sharer 130 may stream a verified video to the receiver terminal 300 to prevent tampering. When a verified video is streamed to the receiver terminal 300, the verified video is not downloaded to the receiver terminal 300, and thus it is not possible to edit the verified video on the receiver terminal 300. Accordingly, tampering with the verified video is prevented.

Unlike this, the verified video sharer 130 may allow the receiver terminal 300 to download the verified video which is non-editable and non-retransmissible to prevent tampering. When the verified video which is non-editable and non-retransmissible is downloaded to the receiver terminal 300, it is not possible to edit and/or retransmit the downloaded verified video on the receiver terminal 300, and thus tampering with the verified video is prevented.

Meanwhile, the verified video sharer 130 may transmit the verified video to any one receiver terminal 300 specified by the user so that the verified video may be privately shared between the verified video creator and one receiver in a customer to customer (C2C) manner.

In this case, for example, a user who wants to join a company may create a verified video for introducing himself or herself and transmit the verified video to a personnel manager through the system 100 for privately sharing a verified video.

Meanwhile, the verified video sharer 130 may transmit the verified video to a plurality of receiver terminals 300 specified by the user so that the verified video may be privately shared among the verified video creator and a plurality of receivers in a customer to business (C2B) manner.

In this case, for example, a user who sells goods may create a video for introducing the goods and transmit the video to a plurality of receiver terminals 300 for running marketplaces through the system 100 for privately sharing a verified video to register the goods.

In this way, the present invention ensures that a video recorded in real time by a video creator is not tampered with by a third party and thus can prevent the original video from being edited and maliciously used.

Meanwhile, according to an additional aspect of the present invention, the non-temperable verified video may include unique anti-tampering information in metadata. For example, the unique anti-tampering information may include a unique MAC address and geolocation of the user terminal 200 on which the verified video app is installed.

The MAC address is a unique identification number of a personal computer for identifying a specific computer or mobile device. While an Internet protocol (IP) address may be changed by a user at will on a network, a MAC address is stored in a local area network (LAN) card (a device for accessing a network to transmit and receive data) and thus cannot be changed by a user at will. Accordingly, a MAC address may be used for preventing tampering with a verified video.

A geolocation is digital location information of a current location of the user terminal 200, such as a smartphone, a computer, etc. connected to a wired or wireless network. The verified video app installed on the user terminal 200 may acquire user location information using a geolocation application programming interface (API).

Whether the verified video is tampered with may be found by comparing metadata of the original verified video with the metadata of the verified video and determining whether unique MAC addresses and geolocations of a user terminal included in the metadata are the same.

Meanwhile, according to an additional aspect of the present invention, the unique MAC address of the user terminal 200 on which the verified video app is installed may be overlayed on a specific area of a displayed screen at a time point at which the non-tamperable verified video is recorded.

Since the unique MAC address of the user terminal 200 on which the verified video app is installed may be used for preventing tampering with a verified video as described above, the unique MAC address of the user terminal 200 on which the verified video app is installed may be overlayed on the specific area in the displayed screen at the time point at which the non-tamperable verified video is recorded to notify that the verified video is not tampered with.

Meanwhile, according to an additional aspect of the present invention, a recording time and a time zone may be further overlayed on the specific area of the displayed screen at the time point at which the non-tamperable verified video is recorded.

When the recording time and the time zone are overlayed on the specific area in the displayed screen of the verified video at the recording time point, the recording time and the time zone of the verified video can be checked, and thus it is possible to determine whether the verified video is tampered with by comparing the recording time and the time zone of the verified video with a recording time and a time zone of the original verified video.

Meanwhile, according to an additional aspect of the present invention, an anti-tampering authentication mark may be further overlayed on the specific area of the displayed screen at the time point at which the non-tamperable verified video is recorded.

The anti-tampering authentication mark is unique image information, such as a specific quick response (QR) code, a specific pattern, etc., for determining whether the verified video is tampered with. A video in which the anti-tampering authentication mark is not overlayed on the specific area in the displayed screen may be determined to have been tampered with.

Meanwhile, according to an additional aspect of the present invention, the system 100 for privately sharing a verified video may further include a video clustering part 140. The video clustering part 140 clusters a plurality of individual verified videos and generates clustered verified videos.

The individual verified videos clustered by the video clustering part 140 may be history videos acquired by recording an event in a time series or videos grouped by subject but are not limited thereto.

For example, a plurality of user terminals 200 may share a hash tag of a common event or subject and participate in clustering verified videos through users clicking on the hash tag. When the plurality of user terminals 200 download and execute the verified video app to record individual verified videos, the video clustering part 140 clusters the individual verified videos in sequence to generate clustered verified videos.

The clustered verified videos are handled and played as one video in the receiver terminal 300. For example, a road-paving process may be chronologized to generate clustered verified videos, or a goods packaging process may be chronologized to generate clustered verified videos.

Meanwhile, according to an additional aspect of the present invention, the system 100 for privately sharing a verified video may further include a ticket issuer 150. The ticket issuer 150 issues a digital ticket that permits recording of a verified video to the user terminal 200.

The ticket issuer 150 may be requested to issue the digital ticket that permits recording of a verified video by the user terminal 200 or a terminal (not shown) of a third party who gifts the user terminal 200 with the digital ticket. The ticket issuer 150 may perform a payment process, such as payment with a credit card, simple payment with a cellular phone, an account transfer, etc., and then issue the digital ticket.

For example, the ticket issuer 150 may issue the digital ticket that permits recording of a verified video to the user terminal 200 in the form of a uniform resource locator (URL) link, and the user terminal 200 may download the verified video app through the URL link and execute the verified video app to record and upload a verified video.

Meanwhile, according to an additional aspect of the present invention, the system 100 for privately sharing a verified video may further include a private sharing target manager 160. The private sharing target manager 160 stores a unique MAC address of a receiver terminal which plays the verified video, a date and time at which the verified video is played, and a number of times that the verified video is played in the DB and manages a play log.

The private sharing target manager 160 may provide a user interface (UI) for specifying the receiver terminal 300 which will receive the verified video uploaded from the user terminal 200 so that information on the receiver terminal 300 which will receive the verified video may be input through the UI. For example, the information on the receiver terminal 300 which will receive the verified video may be the mobile phone number of the owner of the receiver terminal 300.

Also, according to a request from the user terminal 200, the private sharing target manager 160 may change or delete the information on the receiver terminal 300 which will receive the verified video or restrict authority to access the verified video.

The verified video that is received from the system 100 for privately sharing a verified video according to the present invention and played through the receiver terminal 300 is not editable or retransmissible on the receiver terminal 300 unless it is allowed by the user terminal 200 which creates the verified video to edit or retransmit the verified video.

Meanwhile, the verified video that is uploaded to the system 100 for privately sharing a verified video according to the present invention may be deleted from the system 100 for privately sharing a verified video or restricted in authority to access in accordance with a request from the user terminal 200 which created the verified video.

Figure 2:
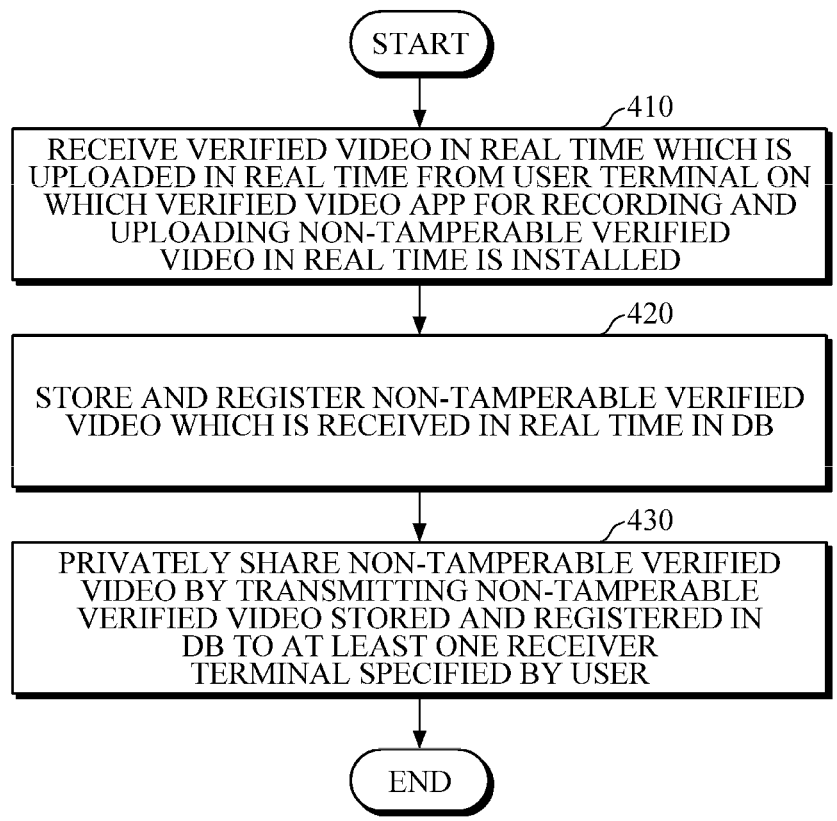
FIG. 2 is a flowchart illustrating operations of privately sharing a verified video by the system for privately sharing a verified video according to the present invention.

Operations of privately sharing a verified video by the above-described system 100 for privately sharing a verified video according to the present invention will be described below with reference to FIG. 2. FIG. 2 is a flowchart illustrating operations of privately sharing a verified video by the system for privately sharing a verified video according to the present invention.

First, in a verified video receiving operation 410, the system for privately sharing a verified video receives a verified video in real time which is uploaded in real time from a user terminal on which a verified video app for recording and uploading a non-tamperable verified video in real time is installed. This has been described above, and thus the description will not be reiterated.

Subsequently, in a verified video registration operation 420, the system for privately sharing a verified video stores and registers the non-tamperable verified video received in real time through the verified video receiving operation 410 in a DB. This has been described above, and thus the description will not be reiterated.

Subsequently, in a verified video sharing operation 430, the system for privately sharing a verified video transmits the non-tamperable verified video stored and registered in the DB through the verified video registration operation 420 to at least one receiver terminal specified by a user and privately shares the non-tamperable verified video. This has been described above, and thus the description will not be reiterated.

In this way, the present invention ensures that a video recorded in real time by a video creator is not tampered with by a third party and thus can prevent the original video from being edited and maliciously used. Accordingly, the object presented above can be achieved.

The present invention ensures that a video recorded in real time by a video creator is not tampered with by a third party and thus can prevent the original video from being edited and maliciously used.

The various exemplary embodiments disclosed in the specification and the drawings propose specific examples to help understanding and are not intended to limit the scope of the present invention.

Therefore, various exemplary embodiments of the present invention should be interpreted to encompass all alterations or modifications derived from the technical spirit of the present invention as well as the exemplary embodiments described herein.

What is claimed is:

1. A system for privately sharing a verified video, the system comprising:
   a verified video receiver configured to receive a verified video in real time which is uploaded in real time from a user terminal on which a verified video application (app) for recording and uploading a non-tamperable verified video in real time is installed;
   a verified video registrar configured to store and register the non-tamperable verified video received in real time by the verified video receiver in a database (DB);
   a verified video sharer configured to transmit the non-tamperable verified video stored and registered in the DB by the verified video registrar to at least one receiver terminal specified by a user and privately share the non-tamperable verified video; and
   a video clustering part configured to cluster a plurality of individual verified videos, including the non-tamperable verified video, and generate a clustered verified video based thereon,
   wherein the video clustering part is configured to:
   share a hash tag related to a common event or subject among a plurality of user terminals including the user terminal, and when the plurality of individual verified videos are captured through verified video applications executed by user terminals participating in verified video clustering through clicking the hash tag, cluster the plurality of individual verified videos to generate the clustered verified video.

2. The system of claim 1, wherein the non-tamperable verified video includes unique anti-tampering information in metadata.

3. The system of claim 2, wherein the unique anti-tampering information includes a unique media access control (MAC) address and geolocation of the user terminal on which the verified video app is installed.

4. The system of claim 1, wherein a unique media access control (MAC) address of the user terminal on which the verified video app is installed is overlayed on a specific area of a displayed screen at a time point at which the non-tamperable verified video is recorded.

5. The system of claim 4, wherein a recording time and a time zone are further overlayed on the specific area of the displayed screen at the time point at which the non-tamperable verified video is recorded.

6. The system of claim 5, wherein an anti-tampering authentication mark is further overlayed on the specific area of the displayed screen at the time point at which the non-tamperable verified video is recorded.

7. The system of claim 1, wherein the verified video sharer streams the verified video to the receiver terminal to prevent tampering.

8. The system of claim 1, wherein the verified video sharer downloads the verified video which is non-editable and non-retransmissible to the receiver terminal to prevent tampering.

9. The system of claim 1, wherein the verified video app blocks access from other apps to prevent tampering.

10. The system of claim 1, further comprising a ticket issuer configured to issue a digital ticket that permits recording of the verified video to the user terminal.

11. The system of claim 1, further comprising a private sharing target manager configured to store a unique MAC address of the receiver terminal which plays the verified video, a date and time at which the verified video is played, and a number of times that the verified video is played in the DB and manage a play log.

12. A method for privately sharing a verified video, the method comprising:
   receiving, by a verified video receiver, a verified video in real time which is uploaded in real time from a user terminal on which a verified video application (app) for recording and uploading a non-tamperable verified video in real time is installed;
   storing and registering, by a verified video registrar, the non-tamperable verified video received in real time in a database (DB);
   transmitting, by a verified video sharer, the non-tamperable verified video stored and registered in the DB to at least one receiver terminal specified by a user and privately sharing the non-tamperable verified video;
   clustering, by a video clustering part, a plurality of individual verified videos, including the non-tamperable verified video, and generating a clustered verified video based thereon;
   sharing, by the video clustering part, a hash tag related to a common event or subject among a plurality of user terminals including the user terminal; and
   when the plurality of individual verified videos are captured through verified video applications executed by user terminals participating in verified video clustering through clicking the hash tag, clustering, by the video clustering part, the plurality of individual verified videos to generate the clustered verified video.

13. The method of claim 12, wherein the non-tamperable verified video includes unique anti-tampering information in metadata.

14. The method of claim 13, wherein the unique anti-tampering information includes a unique media access control (MAC) address and geolocation of the user terminal on which the verified video app is installed.

15. The method of claim 12, wherein a unique media access control (MAC) address of the user terminal on which the verified video app is installed is overlayed on a specific area of a displayed screen at a time point at which the non-tamperable verified video is recorded.

16. The method of claim 15, wherein a recording time and a time zone are further overlayed on the specific area of the displayed screen at the time point at which the non-tamperable verified video is recorded.

17. The method of claim 16, wherein an anti-tampering authentication mark is further overlayed on the specific area of the displayed screen at the time point at which the non-tamperable verified video is recorded.

\* \* \* \* \*